(12) United States Patent
Lavender

(10) Patent No.: US 9,641,002 B2
(45) Date of Patent: May 2, 2017

(54) BATTERY MANAGEMENT SYSTEM, METHOD AND BATTERY

(75) Inventor: John Paul Lavender, Caterham (GB)

(73) Assignee: PAG LTD., London (GB)

( * ) Notice: Subject to any disclaimer, the term of this patent is extended or adjusted under 35 U.S.C. 154(b) by 813 days.

(21) Appl. No.: 13/525,880

(22) Filed: Jun. 18, 2012

(65) Prior Publication Data

US 2013/0057076 A1    Mar. 7, 2013

(30) Foreign Application Priority Data

Sep. 2, 2011  (GB) .................................. 1115200.6

(51) Int. Cl.
| | |
|---|---|
| *H02J 1/00* | (2006.01) |
| *H02J 3/00* | (2006.01) |
| *H02J 7/00* | (2006.01) |
| *H02J 1/10* | (2006.01) |
| *H02J 7/34* | (2006.01) |
| *H01M 10/42* | (2006.01) |

(Continued)

(52) U.S. Cl.
CPC ............... *H02J 7/00* (2013.01); *H01M 10/42* (2013.01); *H02J 1/10* (2013.01); *H02J 7/0021* (2013.01); *H02J 7/0045* (2013.01); *H02J 7/34* (2013.01); *H01M 2/10* (2013.01); *H01M 2/1011* (2013.01); *H01M 2/1016* (2013.01); *H01M 2/1061* (2013.01); *H01M 2/1077* (2013.01); *H01M 2/30* (2013.01); *H01M 2010/4271* (2013.01); *Y02T 10/7055* (2013.01); *Y10T 307/696* (2015.04)

(58) Field of Classification Search
CPC ........ H02J 7/00; H02J 7/0036; Y10T 307/696
USPC .......................................................... 307/80
See application file for complete search history.

(56) References Cited

U.S. PATENT DOCUMENTS

| 1,536,322 A | 5/1925 | Benjamin |
|---|---|---|
| 1,646,807 A | 10/1927 | Benjamin |
| (Continued) | | |

FOREIGN PATENT DOCUMENTS

| DE | 2542933 A1 | 3/1977 |
|---|---|---|
| EP | 0003649 A1 | 8/1979 |
| (Continued) | | |

OTHER PUBLICATIONS

Search Report in co-pending, related GB Application No. 1115200.6, mailed Jan. 26, 2012.

(Continued)

*Primary Examiner* — Carlos Amaya
(74) *Attorney, Agent, or Firm* — Thomas | Horstemeyer, LLP

(57) ABSTRACT

A battery management system includes a master control unit coupled to a plurality of batteries, at least one battery status unit providing data on the status the batteries and a power determination unit providing a measure of the power draw required from the batteries. The master control unit controls the batteries to activate only the number to meet the required power draw. The power determination unit can determine the maximum safe power to a device coupled to the batteries, the master control unit then activating a number of batteries having a combined power capacity not exceeding the safe maximum power. The system allows for a large number of batteries to be coupled to an electrical device and for these to be controlled so as not to produce a current which is too high for the device.

20 Claims, 9 Drawing Sheets

(51) Int. Cl.
 H01M 2/10 (2006.01)
 H01M 2/30 (2006.01)

(56) References Cited

U.S. PATENT DOCUMENTS

| | | |
|---|---|---|
| 2,542,404 A | 2/1951 | Ensign |
| 2,899,669 A | 8/1959 | Johanson |
| 3,335,330 A | 8/1967 | Hall et al. |
| 3,564,482 A | 2/1971 | Yamanaka et al. |
| 3,588,239 A | 6/1971 | Hochstein et al. |
| 3,617,985 A | 11/1971 | Kehl |
| 3,668,605 A | 6/1972 | Albert |
| 3,728,664 A | 4/1973 | Hurst |
| 3,740,696 A | 6/1973 | Schleicher et al. |
| 3,836,885 A | 9/1974 | Larsile |
| 3,967,303 A | 6/1976 | Fischer et al. |
| 3,969,796 A | 7/1976 | Hodsdon et al. |
| 3,984,169 A | 10/1976 | Armstrong et al. |
| 3,997,092 A | 12/1976 | Pogwizd |
| 4,050,003 A | 9/1977 | Owings et al. |
| 4,085,253 A | 4/1978 | Johnson |
| 4,218,107 A | 8/1980 | Wilson |
| 4,261,495 A | 4/1981 | Muller |
| 4,329,962 A | 5/1982 | Johnston |
| 4,340,267 A | 7/1982 | Nukaga |
| 4,420,207 A | 12/1983 | Nishikawa |
| 4,431,245 A | 2/1984 | Jigamian et al. |
| 4,452,383 A | 6/1984 | Marttinen |
| 4,518,217 A | 5/1985 | Corrigan, III |
| 4,545,414 A | 10/1985 | Baum |
| 4,550,968 A | 11/1985 | Corrigan |
| 4,554,221 A | 11/1985 | Schmid |
| 4,554,500 A | 11/1985 | Sokira |
| 4,554,621 A | 11/1985 | Corrigan |
| 4,586,766 A | 5/1986 | Hofmeister |
| 4,616,169 A | 10/1986 | Proffitt |
| 4,709,974 A | 12/1987 | Hawkins |
| 4,810,199 A | 3/1989 | Kar |
| 4,810,204 A | 3/1989 | Wilson |
| 4,822,296 A | 4/1989 | Wilson |
| 4,836,799 A | 6/1989 | Tomer |
| 4,849,682 A | 7/1989 | Bauer et al. |
| 4,878,606 A | 11/1989 | Miller |
| 4,965,738 A | 10/1990 | Bauer et al. |
| 5,007,848 A | 4/1991 | Lee |
| 5,038,093 A | 8/1991 | Edwards et al. |
| 5,057,383 A | 10/1991 | Sokira |
| 5,089,834 A | 2/1992 | Nakasa et al. |
| 5,104,752 A | 4/1992 | Baughman et al. |
| 5,135,406 A | 8/1992 | Ishikawa |
| 5,195,666 A | 3/1993 | Yamaguchi et al. |
| 5,233,281 A | 8/1993 | Chiang et al. |
| 5,251,329 A | 10/1993 | Takagi et al. |
| 5,256,954 A | 10/1993 | Chen |
| 5,287,052 A | 2/1994 | Wang |
| 5,306,172 A | 4/1994 | Inada et al. |
| 5,350,993 A | 9/1994 | Toya et al. |
| 5,369,565 A | 11/1994 | Chen et al. |
| 5,403,093 A | 4/1995 | Flynn, Jr. et al. |
| 5,412,547 A | 5/1995 | Hornblad et al. |
| 5,496,657 A | 3/1996 | Dixon, Jr. |
| 5,592,064 A | 1/1997 | Morita |
| 5,602,454 A | 2/1997 | Arakawa et al. |
| 5,613,863 A | 3/1997 | Klaus et al. |
| 5,616,968 A * | 4/1997 | Fujii et al. ............. 307/66 |
| 5,652,496 A | 7/1997 | Pilarzyk et al. |
| 5,656,914 A | 8/1997 | Nagele et al. |
| 5,663,012 A | 9/1997 | Shannon et al. |
| 5,777,453 A | 7/1998 | Imanaga |
| 5,816,439 A | 10/1998 | Lovell et al. |
| 5,821,732 A | 10/1998 | Chen |
| 5,844,401 A | 12/1998 | Lee |
| 5,917,152 A | 6/1999 | Kameyama |
| 5,921,797 A | 7/1999 | Bass et al. |
| 5,959,368 A * | 9/1999 | Kubo et al. ............. 307/18 |
| 6,102,725 A | 8/2000 | Panagiotou |
| 6,109,938 A | 8/2000 | Meslet et al. |
| 6,233,141 B1 | 5/2001 | Lee et al. |
| 6,247,962 B1 | 6/2001 | DeSorbo |
| 6,285,158 B1 | 9/2001 | Higuchi |
| 6,346,793 B1 | 2/2002 | Shibata et al. |
| 6,384,575 B1 | 5/2002 | Chen et al. |
| 6,457,988 B1 | 10/2002 | Andersen |
| 6,489,744 B2 | 12/2002 | Lavender |
| 6,638,086 B2 | 10/2003 | Lavender et al. |
| 6,749,960 B2 | 6/2004 | Takeshita et al. |
| 6,783,403 B2 | 8/2004 | Lafragette et al. |
| 6,805,997 B1 | 10/2004 | Katayama |
| 6,935,883 B2 | 8/2005 | Oddsen, Jr. |
| 7,064,519 B2 | 6/2006 | Ito |
| 7,271,760 B2 | 9/2007 | Bartosik et al. |
| 7,347,714 B2 | 3/2008 | Liang |
| 7,390,211 B2 | 6/2008 | Moscovitch |
| 8,029,311 B2 | 10/2011 | Ohshima et al. |
| 8,299,656 B2 | 10/2012 | Allard et al. |
| 2005/0226741 A1 | 10/2005 | Huang |
| 2007/0037456 A1 | 2/2007 | Burgess |
| 2008/0254670 A1 | 10/2008 | Balsells et al. |
| 2009/0146610 A1 | 6/2009 | Trigiani |
| 2011/0025258 A1 | 2/2011 | Kim et al. |
| 2012/0038322 A1* | 2/2012 | Moorhead et al. ........... 320/136 |
| 2013/0057076 A1 | 3/2013 | Lavender |
| 2013/0059477 A1 | 3/2013 | Lavender |

FOREIGN PATENT DOCUMENTS

| | | |
|---|---|---|
| EP | 0118598 A2 | 9/1984 |
| EP | 0152650 A1 | 8/1985 |
| EP | 0448755 | 10/1991 |
| EP | 0448767 A1 | 10/1991 |
| EP | 0504713 A1 | 3/1992 |
| EP | 0506439 A1 | 9/1992 |
| EP | 0559573 A1 | 8/1993 |
| EP | 2 164 127 A1 | 3/2010 |
| FR | 2179445 | 11/1973 |
| FR | 2333267 | 6/1977 |
| FR | 2360778 | 3/1978 |
| GB | 1532748 | 11/1978 |
| GB | 1571061 | 7/1980 |
| GB | 2083296 | 3/1982 |
| GB | 2223134 A | 3/1990 |
| GB | 2026086 | 9/1992 |
| GB | 2253513 A | 9/1992 |
| GB | 2260040 A | 3/1993 |
| GB | 2263362 A | 7/1993 |
| GB | 2270832 A | 3/1994 |
| GB | 2071515 | 1/1998 |
| GB | 2335027 A | 9/1999 |
| GB | 2425185 A | 10/2006 |
| JP | 56-54754 A | 5/1981 |
| JP | 58-152231 A | 9/1983 |
| JP | 56-175554 A | 10/1984 |
| JP | 60/150771 A | 8/1985 |
| JP | 5-159755 A | 6/1993 |
| JP | 06/104814 A | 4/1994 |
| JP | 7/143372 A | 6/1995 |
| JP | 08148233 A | 6/1996 |
| JP | 11/191854 A | 7/1999 |
| JP | 2009011138 A | 1/2009 |

OTHER PUBLICATIONS

Extended European Search Report in co-pending, related EP Application No. 12275132.4, mailed Apr. 8, 2015.
"NZ's Pro Audio Show 2011", NZ Video News, vol. 172, Aug. 2011.
PAGlink website extract entitled "High Power Linking Batteries—A one-system Power Solution for Camera Types", Aug. 2011.
Search Report in a related GB Application No. 1115203.0, issued Oct. 25, 2011.

* cited by examiner

BATTERY MANAGEMENT SYSTEM, METHOD AND BATTERY

CROSS REFERENCE TO RELATED APPLICATIONS

The present application claims priority to GB Application No. 1115200.6, filed Sep. 2, 2011.

FIELD OF THE INVENTION

The present invention relates to a battery management system, to a method of controlling the operation of a plurality of electrical batteries, as well as to an electrical battery which is operable in, that is suitable for, a battery management system and method as taught herein.

BACKGROUND OF THE INVENTION

There is a growing need for higher capacity battery technology, particularly for powering increasingly complex electrical devices, as well as for powering larger devices conventionally powered by other energy sources, such as fuel. For instance, High Definition and Very High Definition cameras and other such equipment require much more power than older Standard Definition cameras. Similarly, there is a desire and need to power vehicles from an electrical source rather than using fossil fuels.

Whilst it is possible to make very high capacity batteries which are able to deliver sufficient power for such applications, very high capacity batteries suffer from inherent safety issues. Particularly, incorrect coupling of such batteries, malfunction of the electrical device or damage to the batteries can cause rapid discharge of the batteries and the risk of serious thermal events. There is also, in many instances a desire to have compact batteries for handling or transportation purposes. For instance, current aviation regulations in some countries limit the transportation of batteries in passenger aircraft to those having a capacity of less than 100 Watt-hours. This limits device operating time available from such batteries, particularly in the case of high consumption devices such as High and Very High Definition cameras.

It is known to link together two sub-100 Watt-hour batteries in order to double the overall battery capacity. However, even doubling battery capacity in this manner still does not provide an adequate operating time for some applications.

SUMMARY OF THE PRESENT INVENTION

The present invention seeks to provide an improved electrical battery, as well as a battery management system and method of controlling the operation of a plurality of electrical batteries coupled to one another. The preferred embodiments, described below in detail, provide a battery, system and method which are able to provide for the coupling of a large number of batteries together, even when in total they exceed the maximum safe power rating of that device. This enables the provision of a very high capacity power supply which can provide power to an electrical device for a significant periods of time and for substantially longer than prior art systems and batteries.

According to an aspect of the present invention, there is provided a battery management system for controlling the operation of a plurality of electrical batteries coupled to one another, including a master control unit coupled to each of the batteries, at least one battery status unit operable to provide data relating to the status of each of the batteries of the plurality of batteries, a power determination unit operable to provide a measure of the power draw required from the batteries, wherein the master control unit is operable to control the operation of the plurality of batteries to activate a number of said plurality to meet the required power draw and to deactivate any batteries of said plurality which would cause said plurality of batteries to exceed the required power draw.

The system is such as to be able to couple together batteries having a total capacity greater the power requirement of an electrical device, in practice to be able to power the device for much longer periods than a battery arrangement having a maximum deliverable power of no more than that required by the device. Typically, the batteries are coupled in parallel to one another to increase the overall battery capacity, that is the Watt-hours (Wh) of the battery stack.

Advantageously, the power determination unit is operable to determine the maximum safe power to a device coupled to the plurality of batteries, the master control unit being operable to control the operation of the plurality of batteries to activate a number of said batteries having a combined power capacity not exceeding said safe maximum power.

In the preferred embodiment, there is provided a control unit provided in each of the batteries; the control units being settable as slave units or as the master control unit, the control units being operable to determine which thereof is set the master control unit, the other control units being set as slave units. In other words, there could be provided a plurality of batteries all with a control unit able to act as the master control unit to control the other batteries and equally settable as a slave control unit to take instructions from another battery. In this manner, the battery management system can be formed by a plurality of batteries solely, thus as a system which is entirely self-contained and thus able to be linked to any of a variety of electrical devices. It is not excluded, however, that the master control unit or indeed any other control unit could be part of another device or a separate unit. For instance, in other embodiments, an electrical device could be provided with a controller which is operable as the master control unit taught herein.

Advantageously, the control units are operable to determine the master control unit on the basis of a coupling sequence of the plurality of batteries. This embodiment preferably includes a battery connection element provided in each battery and effective to signal a sequential connection or lack of connection of said battery to another battery of the plurality of batteries. Optionally, the battery connection element includes, in each battery, a battery status terminal and a battery link terminal, wherein the battery link terminal of each battery is connectable to the battery status terminal of another of said batteries, the battery link terminal being operable to detect the presence or absence of a battery status terminal coupled thereto and thereby the connection of a battery thereto.

In an embodiment, the control unit of each battery is operable to set a predetermined output or output sequence on its battery status terminal, signalling the presence of said battery in the plurality of batteries, the battery link terminals being operable to detect a said output or output sequence in order to detect the presence or absence of another battery coupled thereto.

In practice, the control unit of a last battery in a sequence of parallel connected batteries may be operable to indicate said status to at least the battery directly connected thereto and to assign to said last battery in the sequence a unique identifier. The or each control unit is then preferably operable to assign a unique identifier to each battery in the plurality of batteries, the unique identifiers advantageously being indicative of the relative positions of the batteries in the sequence.

In the preferred embodiments, the master control unit is operable to select which battery or batteries of the plurality of batteries are to be active and which are to be deactivated. This selection may be effected, for example, by the master control unit selecting which battery or batteries to activate on the basis of battery charge status. Advantageously, the master control unit is operable to alter the active battery or batteries over time.

The master control unit may be operable to deactivate any battery whose temperature is determined to exceed a predetermined threshold.

Advantageously, the batteries are settable in a charging mode and in a discharge only mode, wherein a battery which is not activated to power a device is set in a discharge only mode, thereby not to draw current from any active battery. The master control unit and/or a battery's control unit may be operable to set the charge/discharge mode of a battery.

In a preferable embodiment, the master control unit is operable to control the charging of the plurality of batteries when connected to one another. For instance, the master control unit may be operable to charge a least charged battery of the plurality of batteries first.

According to another aspect of the present invention, there is provided a method of controlling the operation of a plurality of electrical batteries coupled to one another, including the steps of: obtaining data relating to the status of each of the batteries, determining a measure of the power draw required from the batteries, controlling the operation of the plurality of batteries by activating a number of said plurality to meet the required power draw and by deactivating any batteries of said plurality which would cause said plurality of batteries to exceed the required power draw.

According to another aspect of the present invention, there is provided an electrical battery including a control unit settable as a slave unit or as a master control unit, a battery connection element effective to signal a sequential connection or lack of connection of the battery to another battery, a battery status unit operable to provide data relating to the status of the battery, a power determination unit which provides a measure of required power draw, wherein the control unit, when set as the master control unit, is operable to control the operation of a plurality of batteries to activate a number of said plurality to meet the required power draw and to deactivate any batteries of said plurality which would cause said plurality of batteries to exceed the required power draw.

Advantageously, the battery connection element includes a battery status terminal and a battery link terminal, wherein the battery link terminal of the battery is connectable to the battery status terminal of another battery, the battery link terminal being operable to detect the presence or absence of a battery status terminal coupled thereto and thereby the connection of a battery thereto.

In the preferred embodiment, the control unit of the battery is operable to set a predetermined output or output sequence on its battery status terminal, signalling the presence of said battery, the battery link terminal being operable to detect a said output or output sequence in order to detect the presence or absence of another battery coupled thereto. The control unit, when set as the master control unit, may be operable to select which battery or batteries of a plurality of batteries to be active and which to be deactivated. Similarly, the control unit, when set as the master control unit, may be operable to select which battery or batteries to activate on the basis of battery charge status.

Advantageously, the battery is settable in a charging mode and in a discharge only mode, the control unit being operable to set the battery in the discharge only mode when the battery is not used for powering a device.

BRIEF DESCRIPTION OF THE DRAWINGS

Embodiments of the present invention are described below, by way of example only, with reference to the accompanying drawings, in which.

DESCRIPTION OF THE PREFERRED EMBODIMENTS

Figure 1:
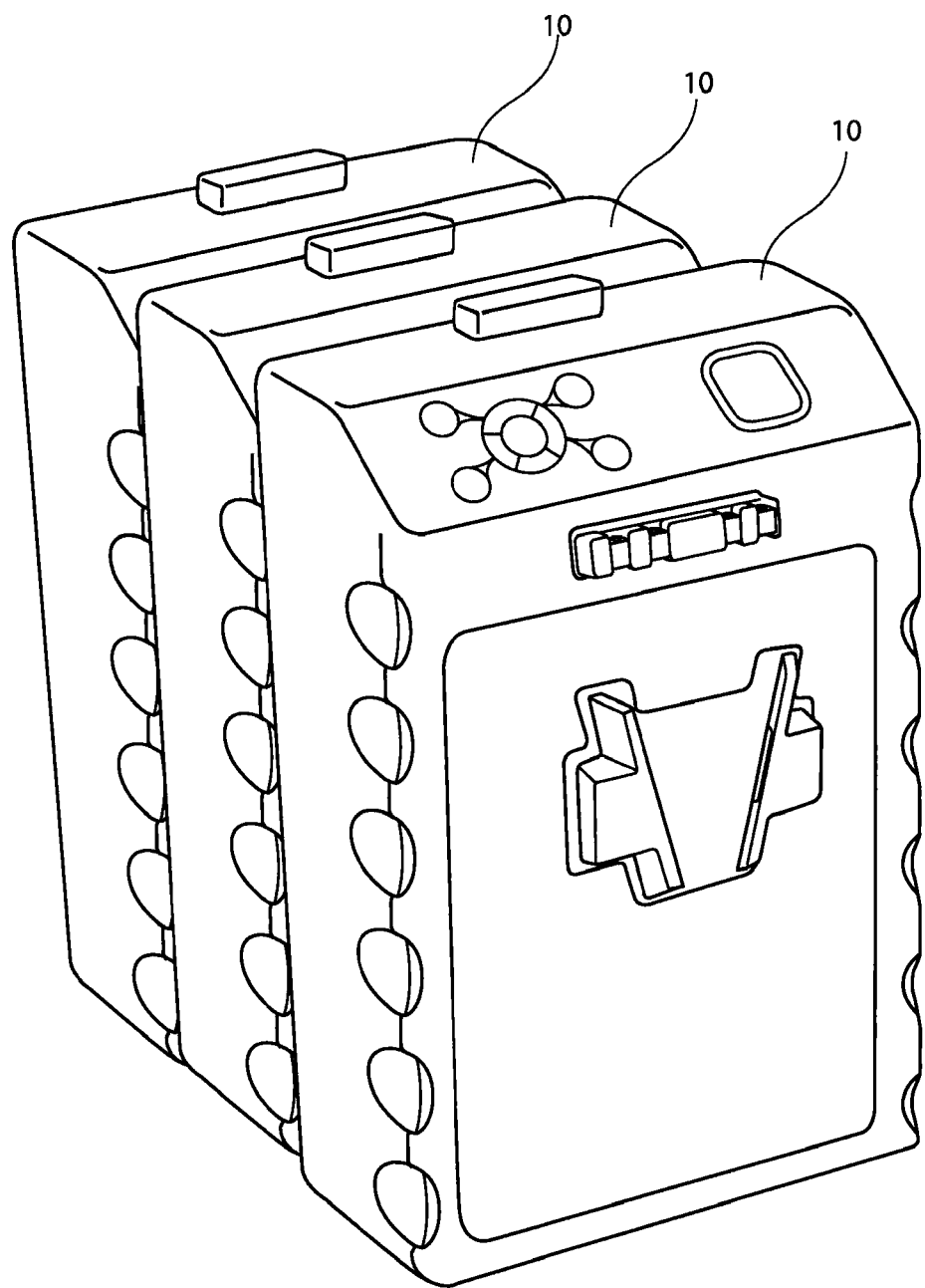
FIG. 1 is a schematic diagram of three batteries of the type taught herein, coupled to one another in a stack to provide an overall increased battery capacity (Wh)

Referring first to FIG. 1, the teachings disclosed herein are directed to coupling a plurality of batteries together in a stack in order to increase the capacity of a battery-based power supply to an electrical device. The stack can provide greater current to the device and/or can power the device for a greater length of time than can a single battery. This improvement can be achieved even with batteries having a relatively low capacity or current rating.

With reference to FIG. 1, there are shown three batteries 10, which in this example are identical in their characteristics, coupled together mechanically and electrically in parallel. The couplings, therefore, are such that the potential difference across the battery terminals remains the same but the total current rating of the batteries is, in this example, multiplied threefold. Other embodiments may provide for electrical coupling of batteries in series in order to increase potential difference.

Figure 5:
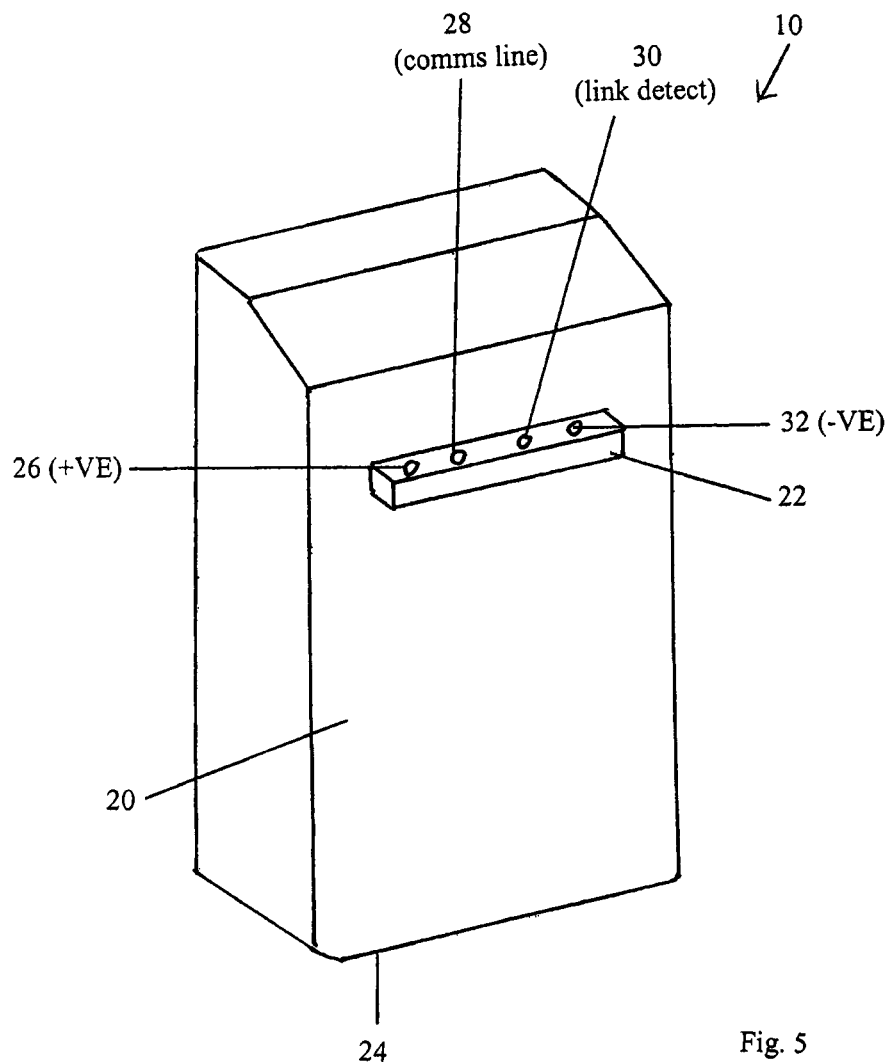
FIG. 5 is a schematic diagram of the front face of a battery of the type taught herein, showing a female terminal block of the battery.
Figure 6:
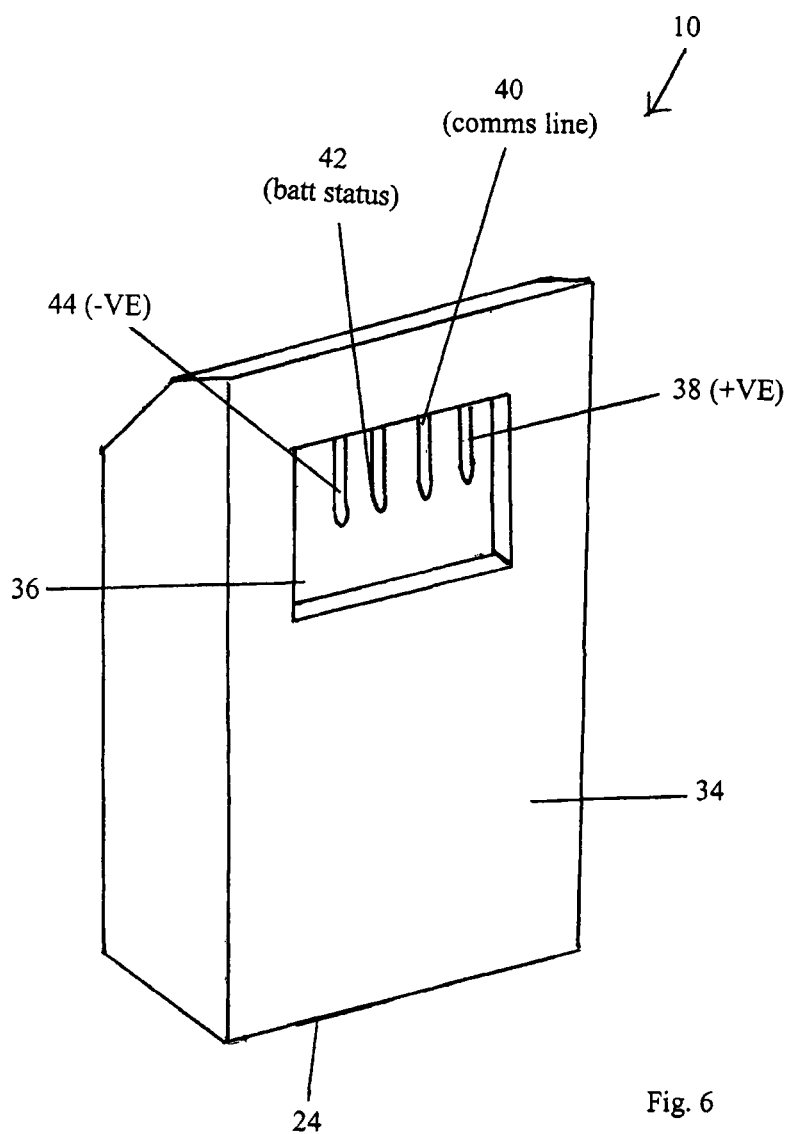
FIG. 6 is a view of the rear of the battery of FIG. 5.

The mechanical couplings of the batteries, of which further details are described below with reference to FIGS. 5 and 6, are such that each battery has a female terminal block as well as a male terminal block. The batteries 10, therefore, are substantially identical in their structures, so as to be connectable in any order and such that a virtually unlimited number of batteries 10 can be coupled together. A variety of coupling arrangements could be devised although a preferred arrangement (shown in schematic form in FIGS. 5 and 6) is described in the applicant's co-pending British patent application no. 1115203.0 filed on 2 Sep. 2011. It is to be understood, however, that the mechanical coupling arrangement is not the focus of the present disclosure.

Figure 2:
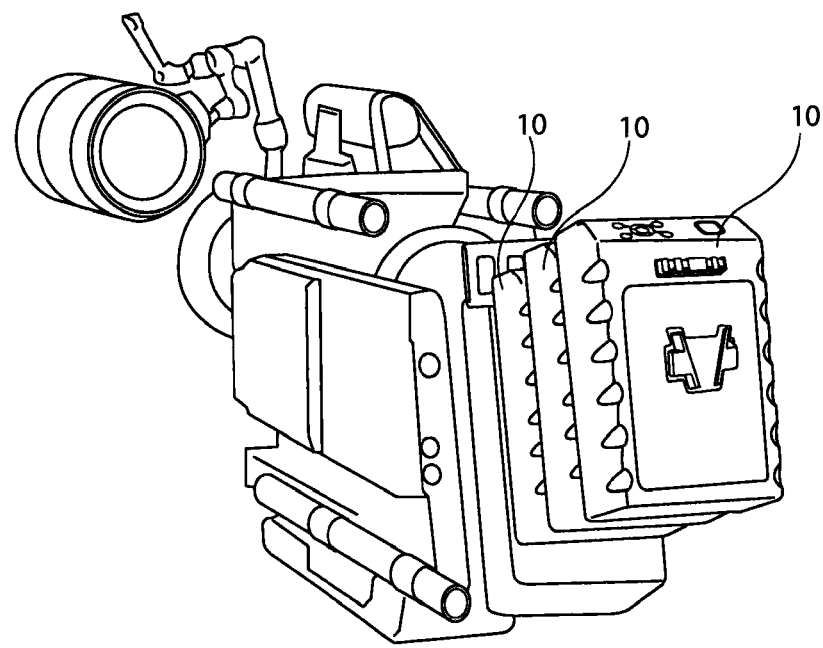
FIG. 2 shows in schematic form an example application for a battery stack of the type shown in FIG. 1, in this embodiment being coupled to a professional camera.

Referring now to FIG. 2, the batteries 10, hereinafter referred to as a stack, are shown coupled to a professional camera 12. The number of batteries 10 in the stack can be chosen according to the needs and use of camera 12, from a single battery in some instances to a large number. It will be appreciated, of course, that there is likely to be a practical limit to the number of batteries which can be stacked together, dependent for example on weight, usage of the device and so on. There is, however, no theoretical limit to the number of batteries which can be stacked.

Figure 3:
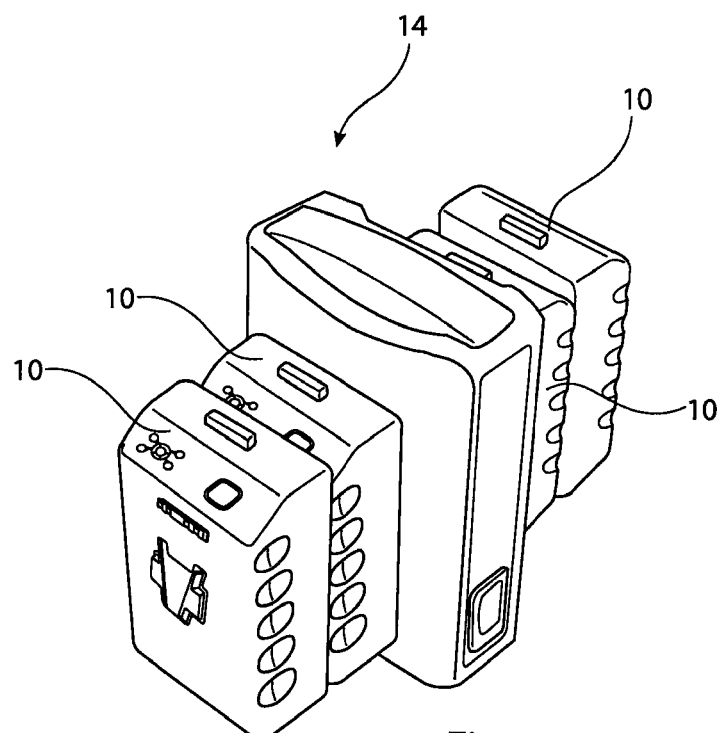
FIG. 3 shows an example of charging arrangement for charging batteries of the type shown in FIG. 1.
Figure 4:
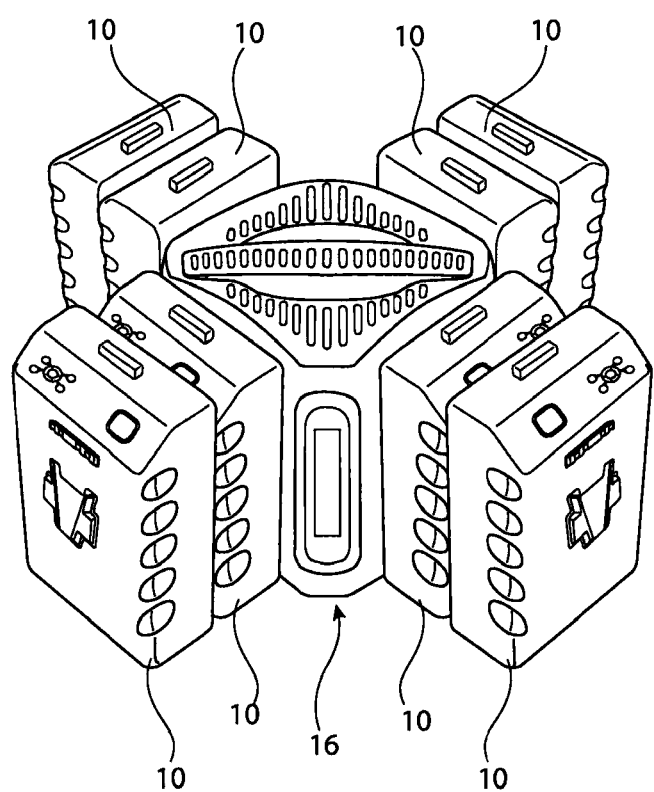
FIG. 4 shows another example of a charging arrangement for charging batteries of the type shown in FIG. 1.

FIGS. 3 and 4 show two different battery chargers, 14 and 16 respectively, designed for charging a plurality of batteries 10. The batteries 10 can be controlled by the battery management system and method disclosed herein in a manner which allows charging of the batteries 10 when they are stacked together. Existing battery systems requires the batteries to be charged individually. Thus, by the teachings herein, a greater number of batteries can be charged simultaneously by a charger 14, 16, than with prior art arrangements.

Referring now to FIGS. 5 and 6, these show, respectively, front and rear views of an embodiment of battery 10 according to the teachings herein. Specific details of the structure of the battery 10 can be found, as explained above, in the applicant's co-pending British patent application no. 1115203.0 filed 2 Sep. 2011.

With reference to FIG. 5, the front face 20 of battery 10 has extending out therefrom a female terminal block 22, which lies substantially horizontally with respect to the base 24 of the battery. The female terminal block 22 includes, in this example, four female terminals which provide, respectively, a positive power terminal 26, a communications line 28, a link detect line 30 and a negative power terminal 32. It will be appreciated that the negative terminal 32 will generally be at nominal ground. For powering an electronic device such as a camera, the battery 10 may typically produce 14 to 17 volts across its positive and negative terminals 26, 32.

The female terminals 26, 32 are, in this embodiment, channels or bores through the terminal block 22 which are lined with a tubular or annular female connector for receiving an associated male electrical terminal. The female connectors are coupled to the circuitry in the battery as well as to the battery cells.

Referring now to FIG. 6, there is shown in schematic form the rear side 34 of battery 10 of FIG. 5. This side 34 has a recess 36 of a depth preferably sufficient to accommodate the projection of the female terminal dock 22. Within the recess 36 there extend, towards the base 24, a plurality of male terminal pins 38-44, which in this example are four in number, as per the female terminals 26-32. The male terminal pins include a positive voltage terminal 38, a communications line terminal 40, a battery status terminal 42 and a negative or nominal ground terminal 44. The pins of the terminals 38-44 are positioned and sized so as to fit into respective female terminals 26-32 and in particular such that: the positive female terminal 26 couples to the positive male terminal 38 of two batteries 10 coupled together; the female communications line terminal 28 couples to the male communications line terminal 40; the female link detect terminal 30 couples to the male battery status terminal 42; and the female negative terminal 32 couples to the negative male terminal 44.

The skilled person will appreciate that the arrangement of female and male terminals can be transposed, such that the male terminals are located at the front face 20 of the battery 10 and the female terminals on the rear face 34. Whether or not the terminals are male or female is immaterial to the teachings herein, as long as a plurality of batteries 10 can be coupled together in a sequence of the type shown in FIG. 1.

As each battery 10 is, in the preferred embodiment, provided with both a female terminal block 22 and a male terminal arrangement 36-44, any number of batteries 10 can be coupled together in a stack. As explained above, the coupling is preferably such that the capacity (Watt-hours) increases with the number of batteries stacked together, thereby to provide greater current and/or greater operating time of the stack to a given electrical device.

Figure 7:
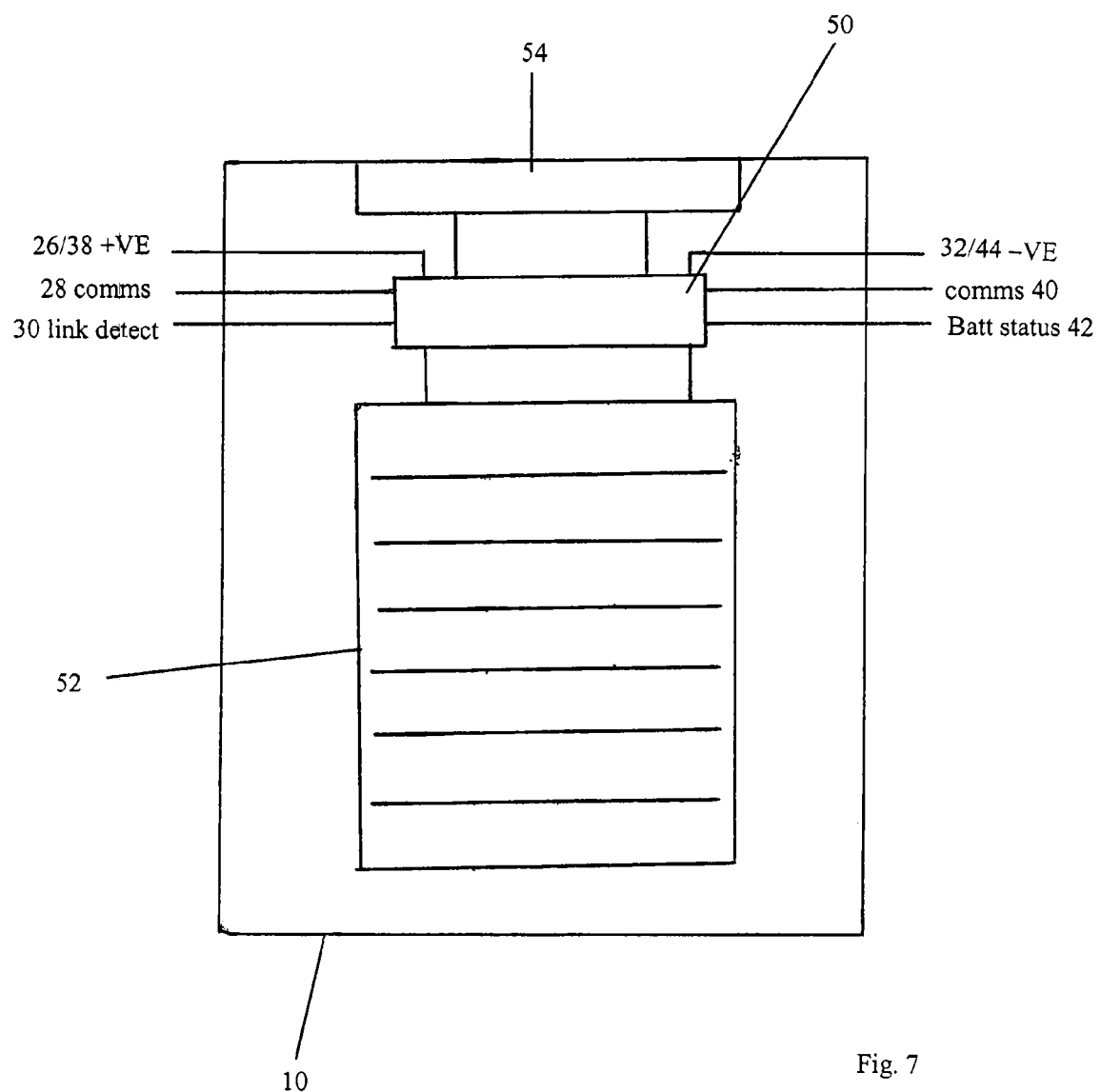
FIG. 7 is a schematic diagram of the principal components housed within the battery of FIGS. 1 to 6.

Referring now to FIG. 7, there is shown in schematic form the principal components of battery 10. These include a control unit 50 and a plurality of cells 52, for instance of lithium ion (Li-ion). The cells 52 can be of conventional form and therefore are not described in any further detail herein.

Each battery 10 also preferably includes a user interface 54, which may include a display and/or input keys for operating or determining the status of the battery 10. The structure and functionality of the control unit 50 and user interface unit 54 will be apparent from the disclosure below.

Each battery 10 is, in the preferred embodiment, configurable as an "alone", a "master" or a "slave" battery, on the basis of the control system and method described below. When a plurality of batteries 10 is coupled together, one battery 10 becomes the master battery or master controller, while the other batteries 10 act as slaves under the control of the master battery. It is preferred that each battery 10 has precisely the same structure and configuration, such that any battery 10 of a plurality of batteries at the disposal of a user can be configured as a master battery of any one stack. It is preferred that all the batteries are, for all purposes, the same in their functionality and ability to be configured. The batteries preferably self-configure, as taught below, such that the user does not have to choose a particular master or slave battery.

It is not excluded that the batteries 10 could be operated by a master control unit which is not a battery. For instance, in some instances the electrical device to be powered by the battery stack may include a controller able to act as the master controller for the stack of batteries. In such a case, the control units of the batteries of the stack would configure themselves as slaves to that controller, even if they have the ability to be configurable as the master control unit. The embodiments described herein are able to behave in this manner.

Figure 8A:
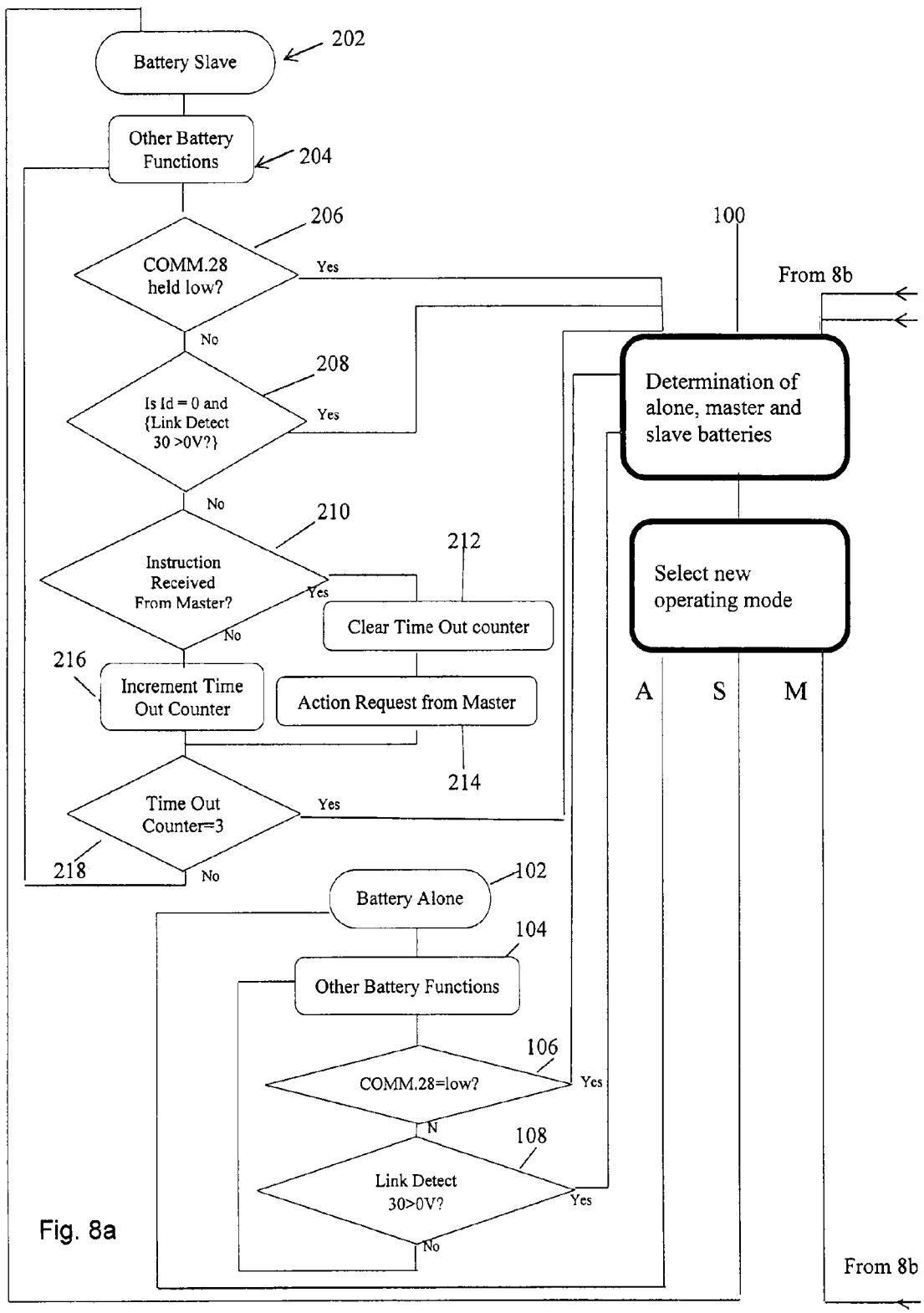
FIGS. 8a and 8b are flow chart depicting the functions of the battery management system and method of the preferred embodiments taught herein.
Figure 8B:
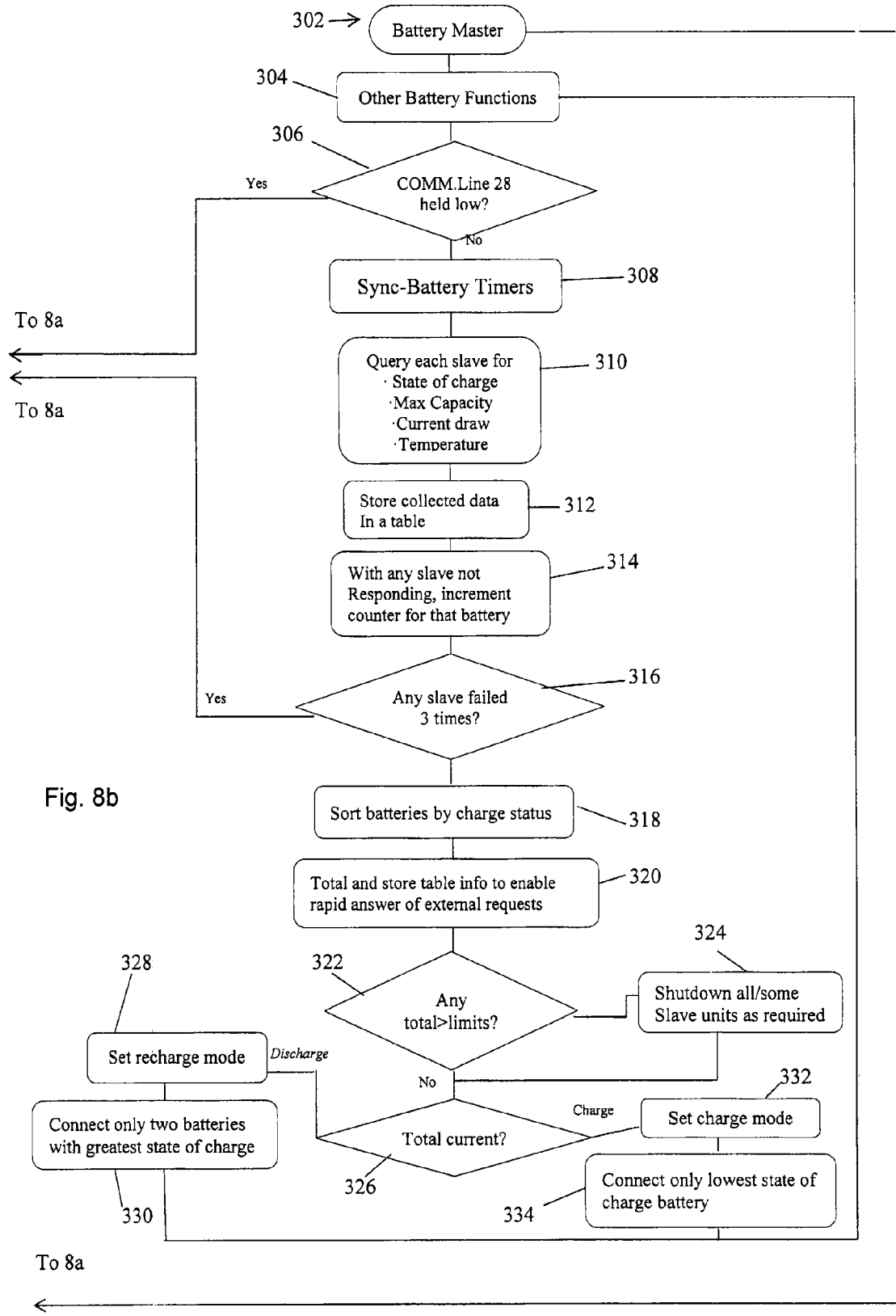

Referring now to FIGS. 8a and 8b, these show a flow chart explaining the operation of the control units 50 of the batteries 10 in all their configurable states, that is as a battery acting alone, as a slave or as a master. Operation as battery acting alone or as a slave is shown in FIG. 8a, whereas a control unit acting as a master is shown in FIG. 8b. These three operating states all refer to a routine 100 for determining the operating state of each battery and which is described below in connection with FIG. 9.

Figure 9:
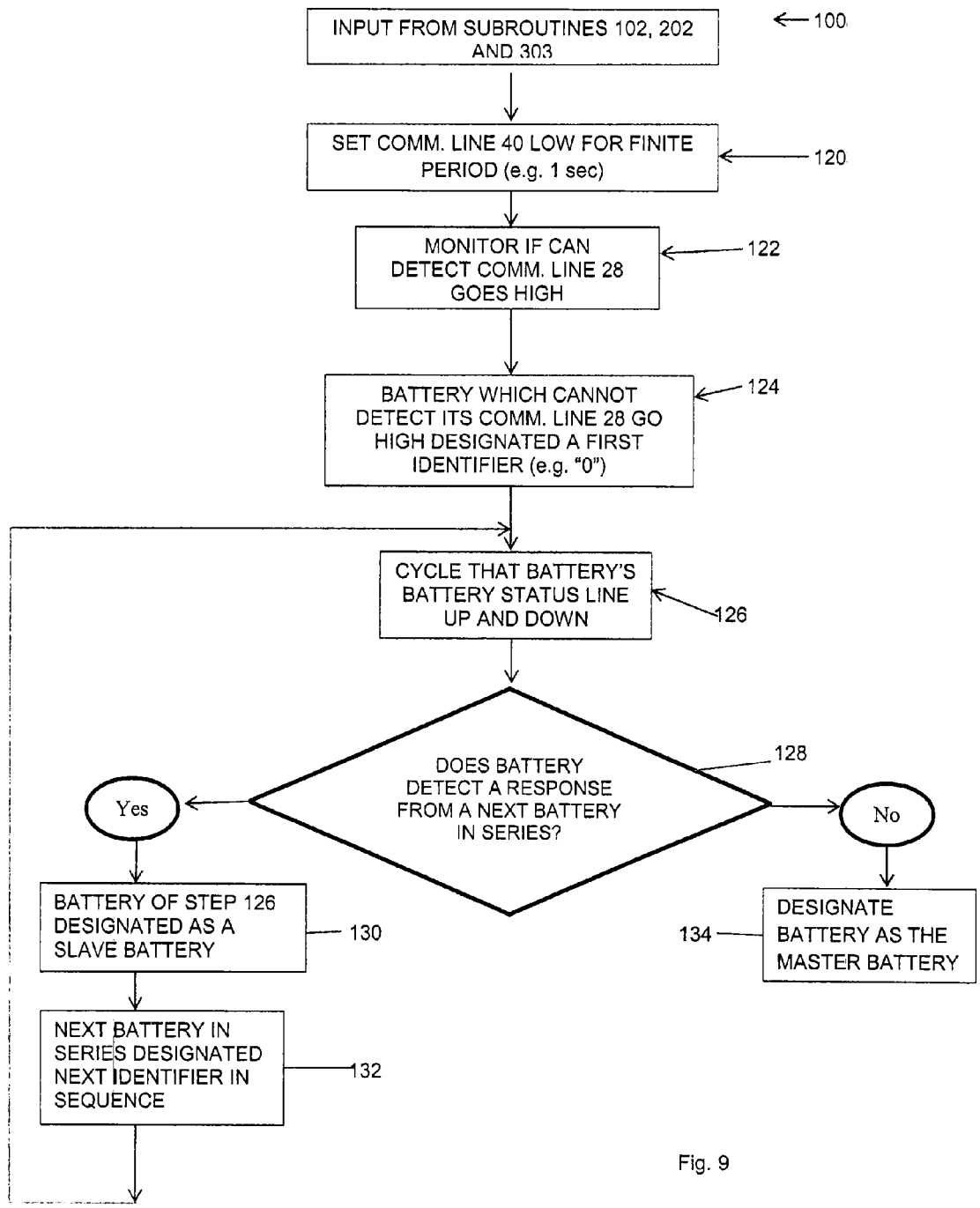
FIG. 9 is a flow chart of the preferred embodiment of method of determining master and slave batteries for the system and method of FIGS. 8a and 8b.

It will be appreciated that the hardware, firmware and software to effect the functionality shown in FIGS. 8a, 8b and 9 is part of and carried out by the control unit 50 of the battery 10. The hardware components required for the control unit are standard in the art and therefore not described in detail herein.

In FIG. 8a, sub-routine 102 operates when there is only one battery coupled to an electrical device. This subroutine is also the default state of the batteries 10.

In first step 104 of sub-routine 102, the control unit 50 of a battery 10 carries out standard battery functions not directly related to the control of the battery or a stack of batteries. These functions include, for example, determining the capacity of the battery, charge status (typically as Watthours and/or percentage total charge), battery type, battery temperature and other functions commonly associated with smart batteries. These functions typically provide to an electrical device data related the battery for use by the device and reference by the user of the device. Data signals from the battery 10 will be transmitted by the battery's status terminal 42 (as shown in FIG. 6) or by a separate electrical terminal of the battery (not shown) matched to the electrical terminals of the electrical device to be powered by the battery 10. In the latter case, the battery 10 may be provided with a plurality of other terminals, for instance at is base 24, compatible with the electrical device and, of course, coupled internally to the terminals 26-32 and 38-44 as appropriate.

At step 106, control unit 50 of the battery 10 will determine whether its communication line 28 in the female terminal block 22 has been pulled low. This line is normally kept high and would be pulled to a low voltage only when another battery is coupled thereto. If at step 106 it is determined is that the communication line has not been pulled low, the routine passes to step 108. At step 108, the control unit 50 of battery 10 determines whether the link detector terminal 30 of the female terminal block 22 is at a low or high voltage. This line is normally kept at a low voltage. If it is detected to be low, sub-routine 102 returns to step 104. On the other hand, if it is detected at step 108 that the link detector terminal 30 has been pulled high, that is above 0 volts, the routine passes to the routine 100 to effect a determination of the status that battery 10 and any other batteries coupled thereto. The reason for this is that the link detector terminal 30 would be pulled high by when another battery is connected to it, given that the link detector 30 would become connected to the battery status terminal 42 of the other battery.

While sub-routine 102 circles through steps 104-108, that battery will behave as a conventional battery, powering an electrical device and providing the conventional battery functions, indicated above, to the electrical device.

Should battery 10 become coupled to another, second, battery 10, by way of attachment of the male terminals 38-44 of the second battery to the corresponding female terminals 26-32 of the first battery, sub-routine 102 would trigger the operation of routine 100 for the following reasons. First, as long as the second battery has some charge, its battery status terminal 42, which would be connected to the link detect terminal 30 of the first battery, would pull the link detect terminal 30 above 0 volts, thereby triggering a yes determination at step 108 of sub-routine 102. Similarly, as described below, a battery or stack of batteries periodically pulls the communication line(s) 40 low, thereby triggering a low detection at the communication line 28 of coupled batteries and giving a positive determination at step 106. When this occurs, the first battery, which would have been acting in an alone status, will be reset to a new operating mode. This will occur substantially instantly when the link detector terminal 30 is pulled high and periodically when the communication line 28 is pulled low, thereby to effect the determination of linked batteries both for a battery which is first in the stack and a newly connected battery.

Referring now to FIG. 9, this shows the routine 100 which determines which battery is to be designated as the master battery and which configures the other batteries in the stack as slave batteries. Routine 100 also assigns a unique identifier, preferably a position number in the stack, to each of the batteries 10 in the stack. The routine 100 is entered from the battery alone sub-routine 102, from the battery slave sub-routine 202 and from the battery master sub-routine 302, the latter two being described in detail below.

The first step of routine 100 sets the communication line 40 of all the batteries to a low voltage for a finite period, for example one second. This period can be of any length which will force a new determination procedure to take place. As soon as a determination is made that at least one of the batteries in a stack is not alone (typically from sub-routine 102) there would be at least two batteries 10 connected together and therefore setting the communication line 40 of both low for finite period can effect a determination for all of the batteries simultaneously.

At step 122, the control units 50 of all the batteries 10 monitor whether their communication line 28/40 goes high after the finite low period of step 120. Where the communication line 28 of one battery is coupled to the communication line 40 of another battery in the stack, that battery will detect its line 28 going high. On the other hand, the last battery in a stack, that is one which has an exposed female terminal block 22 and no electrical couplings thereto, the communication line 28 of that battery will not go high. In this event, at step 124, that battery will determine that it is the first battery in the stack and, in this example, the battery furthest from the electrical device powered by the stack of batteries. That battery is given a first identifier, for example battery zero (0).

If there is any type of failure in the determination routine, it will leave batteries 10 not allocated an Id number. These batteries 10 will force a new determination routine. Cycling through this routine will keep indicator lights in the user interface unit 54 flashing to alert the user. In the preferred embodiment, the connection status is not changed whilst the determination is taking place, and so any safe connection state left from a linked state will be maintained.

Referring to step 126, the first battery in the stack then cycles its battery status line 42 high and low for a finite period (for example one second). That cycling of the battery status line 42 will be detected by the link detect terminal 30 of the next battery coupled thereto, if there is such a battery. In this event, the coupled battery returns to the first battery, via communication terminals 28 and 40, a signal indicative that it has detected the cycling of the battery status line 42. Thus, at step 128 the first battery, which has cycled its battery status line 42 in step 126, waits for a responses for the next battery in the series. If that response is received, the battery of step 126 is, at step 130, designated as a slave battery. The first time routine 100 is performed, the first battery which is designated as a slave battery is the battery which is given the first identifier, in this example identifier 0. In step 132, the battery which is coupled to battery 0 is given in step 128 the next identifier in the sequence, in this example battery 1.

If, on the other hand, at step 128 the battery which has cycled its battery status line 42 high and low receives no response from a subsequent battery in the stack sequence, determination step 128 moves to step 134 to designate that battery as the master battery. This occurs, it will be appreciated, when the last battery in the stack does not get a response through its communications line that a battery has detected the cycling which it has effected on its battery status line 42.

It will be appreciated that steps 126-132 will repeat throughout the whole set of batteries in a stack until the very last battery is reached, such that all but the last battery are set as slave batteries and the last is configured as the master.

Referring next to sub-routine 202, this sub-routine is affected for each battery which is set as a slave battery in the stack, that is all but the master battery. At step 204, each slave battery performs its conventional battery functions including, for example, determining its charge status, temperature and so on, and transmits that data through battery status line 42. It will be seen in connection with sub-routine 302, that all of the batteries in a stack are time synchronised so that the data in each slave battery 10 is transferred in an orderly manner to the master battery for processing. That data will be accompanied, in a manner which will be evident to the person skilled in the art, with that battery's unique identifier.

At step 206, the (or each) slave battery determines whether its communication line 28 is held low. If so, indicating a new battery in the stack, sub-routine 202 is exited and routine 100 performed again. If, on the other hand, it is not detected at step 206 that the communication line 28 of the slave battery is held low, the routine passes to step 208, which is a determination carried out by the first battery in the stack, that is battery 0. At step 208, therefore, if the identifier is 0 and it is determined that the link detect terminal 30 of that battery is high, sub-routine 202 is exited and routine 100 repeated. The reason is that if the link detect terminal 30 of battery 0 is pulled up, this is indicative of a new battery having been added to the stack and thus of it being necessary to reassign the battery statuses and battery identifiers.

If it is not detected at either steps 206 or 208 that a new battery has been added to the stack, sub-routine 202 proceeds to steps 210-218, which monitors for requests from the master battery and also carries out any instructions from the master battery. If the master fails to provide any instructions, sub-routine 202 is exited as explained hereinafter.

At step 210, each slave battery determines whether it has received an instruction from the master battery. If it has, the routine passes to step 212, which clears a timeout counter of that slave and then passes to step 214 where the instruction received from the master is actioned. On the other hand, if no instruction has been received from the master, the routine passes to step 216, where the timeout counter is incremented by one. It will be appreciated that the master battery will send an instruction to every slave within the pre-set count period even if the instruction is not to supply current. (The instruction may just be a status request).

Following from step 216, if at step 218 it is determined that the timeout counter has reached a threshold number of periods, in this example 3, sub-routine 212 is exited, on the basis that there has been loss of connection with the master. On the other hand, if the timeout counter has not reached the threshold count, this is example 3, sub-routine 202 is repeated.

As explained above, sub-routine 202 is carried out by every slave battery in the stack and thus, enables every slave to perform its functions (deliver charge) as and when instructed to do so by the master battery.

Referring now to FIG. 8b, the operation of the master battery is shown. As explained above, the master does not have to be a battery but in some embodiments could be a separate control unit or a part of the electrical device to be powered by the battery stack. In such a case, the master would not perform any battery related functions but would simply perform the control functions set out in the flow chart of FIG. 8b.

At step 304 of sub-routine 302, the master battery will perform the normal battery functions of determining charge status, capacity, remaining time and so on, and will provide this data to the electrical device coupled thereto. In contrast to single battery systems, the control unit 50 of the master battery will provide indications on the basis of all of the batteries in the stack and therefore combined charge, combined capacity and so on. As a result, the electrical device sees a single indication of battery status from the master control unit and, in practice, a battery of substantial capacity and charge.

Next, at step 306, the master battery determines if its communication line 28 is held low, which may be indicative of another battery having been connected to it or to the stack. If so, sub-routine 306 is exited and routine 100 performed again in order to determine the status and sequence order of the batteries in the stack as well as to reassign unique identifiers to the batteries.

When there is no such change, step 306 reaches a negative determination and sub-routine 302 passes to step 308. At this step, the master control unit 50 queries each slave battery to obtain, for example, the state of charge, maximum battery capacity (enabling batteries of different capacity to be stacked together), current draw of the batteries and battery temperature.

At step 308, the master battery synchronises the battery timers of all of the batteries in the stack.

At step 310, the control unit 50 of the master battery stores the data collected at step 308 in a table identifying the results of each query with the relevant battery identifier. If the master battery has failed to receive a response from one of the slave batteries to its queries step 308, at step 312 the master battery increments a counter for that slave battery. At step 314, the master control unit determines whether any slave battery has failed to respond within a predetermined number of periods, this example within 3 periods although that number can be different in other embodiments. If at step 314 it is determined that a slave has failed to respond within a predetermined number of periods, this case 3 times, the sub-routine 302 is exited and routine 100 performed again, on the basis that a failure to respond may be indicative of one or more slave batteries having been removed from the stack. Thus, routine 100 is performed to reassign battery statuses and battery identifiers. Of course, if there are no longer and slave batteries, the master will trigger to its steady state, that is to a battery alone status, and then perform repeatedly sub-routine 102 until it is detected that another battery has been attached to the single battery.

It will be appreciated that where a slave responds to a request from the master battery at step 310, its timeout counter will be cleared.

If at step 314 the master controller determines that no slave has failed for the predetermined numbered periods, it passes to step 318, in which the master battery sorts all of the batteries in the stack by charge status, typically in accordance with the table generated at step 312. It is preferred that when the master is a battery, it includes its charge status in the table generated at step 310, and thus sorts itself also at step 318. However, it is not excluded that in some embodiments the master battery would always retain some charge, irrespective of the charge status of any other batteries connected to it, in order to allow for any and all slave batteries to be removed from the stack for replacement with charged batteries, while still retaining (in the master battery) sufficient charge for powering the electrical device. Thus, the electrical device can remain powered on during replacement of batteries in the stack. This can provide for substantially continuous and uninterrupted power to an electrical device by regular replacement of discharged batteries with charged batteries.

From step 318, sub-routine 302 passes to step 320, which is an optional step, in which the master battery determines a total charge and total current deliverable by the battery stack that stores this in a table or other registry to enable a rapid answer if this data is requested from an external source, typically, an electrical device coupled to the battery stack. At step 322 the master battery determines if any of a predetermined set of parameters of one or more of the batteries in the stack exceeds predetermined limits. These may be, for example be the current delivered by the operating batteries, the temperature of any battery or any other parameter limit which it is desirable to monitor. If it is determined that any such limits have been exceeded, sub-routine 302 passes to step 324, at which all or some of the slave units are shut down as required in order to ensure that those parameter limits of step 322 are no longer breached. This sequence is particularly important, in that it allows the provision of a battery stack having a much higher current capacity than that required for an electrical device coupled to the electrical device. Specifically, if for instance the maximum current capacity for safe operation of an electrical device happens to be total current deliverable by, for example, two batteries; a stack of more than two batteries, 5, 6 or 8 for example (even more), can be coupled to the stack but by steps 322, 324, the master controller will power on only two of the batteries and power off all of the others in the stack. This will ensure that the electrical device is not supplied with more than the acceptable level of current.

In the course of repetition of step 312, as will be appreciated from the above and the description which follows, the master battery will ensure that the electrical device continues to be supplied with sufficient current during the course of discharge of the individual batteries in the stack. It is thus possible to connect to an electrical device a relatively large number of batteries, which are able to provide power for the device for a very long time and many times more than arrangements or other combinations in which the operation of the batteries cannot be controlled in this manner.

If at step 322 it is determined that none of the parameter limits has been exceeded, the routine passes to step 326. At this step, the master battery determines whether the total current associated with the battery stack, determined for example step 320, is indicative of the batteries discharging or charging. When it is indicative of the batteries discharging, that is of the batteries being used to power a device, the sub-routine passes to step 328, that is to a discharge mode. In this mode, at step 330 master control unit connects only, in this example, the two batteries with the greater state of charge, as determined at step 318. The number of batteries which will be instructed to provide power will, of course, be dependent upon the capacity of the individual batteries and the power requirement of the electrical device to which they are connected. Thus, in some examples only a single battery may provide current, whereas in other examples more than two batteries may be provide current. The master control unit will set any or all other batteries in the stack which are not to provide power in a non-powering state.

In the preferred embodiment, at step 330, the master control unit 50 or battery performs the following functions. The master battery 50 makes regular communications with its slave batteries 10. There are a few reasons for this. The first is to confirm to the slave batteries 10 that they are still correctly linked to the master, by the virtue of being communicated with. A second is to allow the master battery 10 maintain a valid table of all connected battery details from which it will create any data transmitted to the application. A third is to transfer the requested connection status to each battery 10.

The periodic request may be in the form of a question (a request for basic information to be returned). The question is sent along with data, showing the current time to run prediction (so the slave battery 10 can display this figure to the user upon request via its user interface unit 54) and next connection request.

Each slave battery 10 replies to the master battery's request with the information. This confirms each slave battery has also received the next connection status request.

When the master battery 10 has determined that all the slave batteries 10 have confirmed reception of this data, it will transmit a message for all the batteries 10 to action the connection status. The master battery 10 will at this point action its own status as part of the battery stack.

Each battery 10 will action a request to be connected immediately and a request for a disconnection after a set number of milliseconds. This ensures that the electrical device is never without power. The duration of such power crossover is slight and the number of batteries switched is limited so as to prevent damage to the electrical device or any large deviation in output voltage.

Following step 330, the sub-routine returns back to step 304 and is repeated again. It will be appreciated that as the sub-routine 302 is cycled through the steps described above, the master battery will continue to provide power to an electrical device to which it is connected, in this example selecting always the two batteries which have the greatest states of charge. As those batteries become discharged, the control unit will select other batteries which will then be the most charged. In practice, the master battery will activate any "new" batteries to discharge before instructing a discharging battery to deactivate, thereby not to interrupt the power to the electrical device connected to the battery stack.

These steps provide a number of other advantages. A first is that in practice there will be a change of which batteries in the stack operate and which ones are dormant during the powering of an electrical device. This will result in the batteries not being powered on all the time but, in effect, having breaks. So doing can keep the temperature of the batteries relatively low and thus prevent overheating of any of the batteries. Secondly, even though it is possible to have a very large number of batteries and thus a very large capacity in terms of charge, only a limited number of batteries are active at any point in time. This substantially contributes to the safety of the battery stack by limiting the risk of any thermal event prompted, for example, from an accident or other malfunction of the battery stack or electrical device connected thereto.

Returning to step 326, if it is determined by the master controller that the total current is indicative of charging of the batteries, the master controller sets, at step 332, the charge mode. In this mode, at step 334, the master controller connects to the electrical device only that battery having the lowest state of charge. In some embodiments, the control unit may connect more than one battery but preferably those having the lowest charge status as determined at step 318. Steps 332 and 334 are relevant for charging of the batteries in particular when the batteries are connected to a charging unit in the arrangement shown, for example, in FIGS. 3 and 4. This has the advantage of enabling batteries in stacked configuration to be coupled to a charger and be charged together. As sub-routine 302 cycles (through the charge mode of steps 332 and 334), all the batteries in the stack are eventually charged, from the least charged first. Thus, it is necessary only to have a single charge unit to be able to charge a large number of batteries.

It will be appreciated that although it is preferred to discharge first those batteries having the greatest state of charge and to charge those batteries having lowest status charge, other embodiments may discharge and charge on the basis of different criteria. It is, however, considered that the embodiment depicted in FIG. 8b and described above provides the optimal functioning of the system.

Similarly, other functionality can be incorporated into the routines performed by the master control system, such as cycling the discharge of the batteries and so on. All such additional functionalities are contemplated within this more general disclosure and encompassed with the appended claims.

The disclosures in British patent application number GB 1115200.6, from which this application claims priority, and in the abstract accompanying this application are incorporated herein by reference.

I claim:

1. A battery management system for controlling the operation of a plurality of electrical batteries coupled to one another in parallel in a stack and stacked on an electrical device, including a master control unit coupled to each of the batteries, at least one battery status unit operable to provide data relating to the status of each of the batteries of the plurality of batteries, a unit operable to provide a measure of the power draw required from the batteries, wherein the master control unit is operable to control the operation of the plurality of batteries to activate a number of said plurality to meet the required power draw and to deactivate any batteries of said plurality which would cause said plurality of batteries to exceed the required power draw, wherein the system is configured to enable the electrical device coupled to and powered by the plurality of batteries to remain powered on during replacement of batteries in the stack, the replacement including removal and insertion of batteries in the stack.

2. A battery management system according to claim 1, including a control unit provided in each of the batteries, the control units being settable as slave units or as the master control unit, the control units being operable to determine which thereof is set the master control unit, the other control units being set as slave units.

3. A battery management system according to claim 2, wherein the control units are operable to determine the master control unit on the basis of a coupling sequence of the plurality of batteries.

4. A battery management system according to claim 3, including a battery connection element provided in each battery and effective to signal a sequential connection or lack of connection of said battery to another battery of the plurality of batteries.

5. A battery management unit according to claim 4, wherein the battery connection element includes, in each battery, a battery status terminal and a battery link terminal, wherein the battery link terminal of each battery is connectable to the battery status terminal of another of said batteries, the battery link terminal being operable to detect the presence or absence of a battery status terminal coupled thereto and thereby the connection of a battery thereto.

6. A battery management system according to claim 5, wherein the control unit of each battery is operable to set a predetermined output or output sequence on its battery status terminal, signalling the presence of said battery in the plurality of batteries, the battery link terminals being operable to detect a said output or output sequence in order to detect the presence or absence of another battery coupled thereto.

7. A battery management system according to claim 2, wherein the control unit of a last battery in a sequence of parallel connected batteries is operable to indicate said status to at least the battery directly connected thereto and to assign to said last battery in the sequence a unique identifier.

8. A battery management system according to claim 7, wherein the or each control unit is operable to assign a unique identifier to each battery in the plurality of batteries.

9. A battery management system according to claim 8, wherein the unique identifiers are indicative of the relative positions of the batteries in the sequence.

10. A battery management system according to claim 1, wherein the master control unit is operable to select which battery or batteries of the plurality of batteries to be active and which to be deactivated.

11. A battery management system according to claim 10, wherein the master control unit selects which battery or batteries to activate on the basis of battery charge status.

12. A battery management system according to claim 10, wherein the master control unit is operable to alter the active battery or batteries over time.

13. A battery management system according to claim 10, wherein the master control system is operable to deactivate any battery whose temperature is determined to exceed a predetermined threshold.

14. A battery management system according to claim 1, wherein the batteries are settable in a charging mode and in a discharge only mode, wherein a battery which is not activated to power a device is set in a discharge only mode, thereby not to draw current from any active battery.

15. A battery management system according to claim 1, wherein the master control unit is operable to control the charging of the plurality of batteries when connected to one another.

16. A battery management system according to claim 1, wherein the system includes a control unit provided in each of the batteries, the control units being settable as slave units or as the master control unit; wherein the system is configured to retain some charge in the master battery to allow for powering an electrical device while any and all slave batteries are removed from the stack for replacement with charged batteries.

17. A battery management system according to claim 1, wherein each of the plurality of batteries are individually contained in an individual enclosure.

18. An electrical battery including a control unit settable as a slave unit or as a master control unit, a battery connection element effective to signal a sequential connection or lack of connection of the battery to another battery, a battery status unit operable to provide data relating to the status of the battery, a unit which provides a measure of required power draw, wherein the control unit, when set as the master control unit, is operable to control the operation of a plurality of batteries, coupled to one another in parallel in a stack on an electrical device, to activate a number of said plurality to meet the required power draw and to deactivate any batteries of said plurality which would cause said plurality of batteries to exceed the required power draw, and to enable the electrical device powered by said plurality of batteries to remain powered on during replacement of batteries in the stack, the replacement including removal and insertion of batteries in the stack.

19. An electrical battery according to claim 18, wherein the battery connection element includes a battery status terminal and a battery link terminal, wherein the battery link terminal of the battery is connectable to the battery status terminal of another battery, the battery link terminal being operable to detect the presence or absence of a battery status terminal coupled thereto and thereby the connection of a battery thereto.

20. An electrical battery according to claim 18, wherein the control unit of the battery is operable to set a predetermined output or output sequence on its battery status terminal, signalling the presence of said battery, the battery link terminal being operable to detect a said output or output sequence in order to detect the presence or absence of another battery coupled thereto.

* * * * *